Dec. 22, 1936.　　A. L. FREEDLANDER　　2,065,442
PRINTER'S BLANKET
Filed Sept. 4, 1934
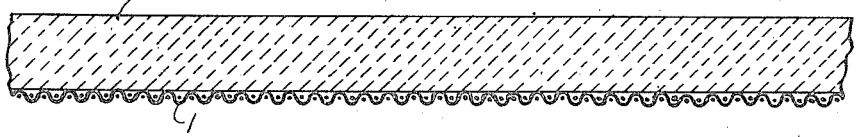
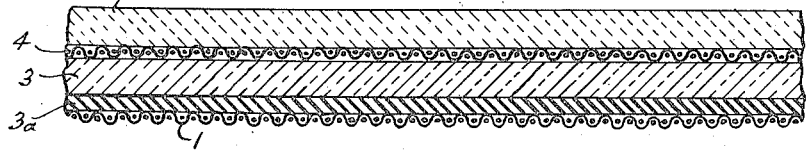
INVENTOR
ABRAHAM L. FREEDLANDER
BY Toulmin & Toulmin
ATTORNEYS.

Patented Dec. 22, 1936

2,065,442

UNITED STATES PATENT OFFICE 2,065,442

PRINTER'S BLANKET

Abraham L. Freedlander, Dayton, Ohio, assignor to The Dayton Rubber Manufacturing Company, Dayton, Ohio, a corporation of Ohio Application September 4, 1934, Serial No. 742,573

3 Claims. (Cl. 154—54.5)

My invention relates to printers' blankets.

Heretofore in the art, great difficulty has been experienced with printers' blankets due to the fact that they are attacked by ink, causing soft spots, or they develop low spots due to the fact that the rubber surface takes a permanent set or becomes tender. This results in not giving enough impressions and results in numerous other difficulties in connection with printers' blankets. The present blankets of the art tend to stretch out of shape, with consequent difficulties.

It is the object of my invention to provide a printer's blanket that will not stretch, that will not be affected by the ink, and will present a smooth, uniform surface throughout its life. It will not develop low spots or soft spots and it will give many more impressions than the present blankets now in use. It will not distort out of shape.

It is my object to provide a pre-shrunk fabric backing and fabric reinforcement in combination with a synthetic resin which has the characteristics of rubber but does not have the disadvantages of rubber of being affected by inks, solvents, oils and certain acids.

It is my object to provide a pre-shrunk fabric and to apply a coating free from all foreign material of uniform thickness upon the pre-shrunk backing.

It is an object to provide a surface that will not be affected by changes of temperature and humidity; and that has the function of evenly and satisfactorily spreading the ink materials.

Referring to the accompanying drawing,

Figure 1 shows one form in section of the blanket of my invention.

Figure 2 shows in section a modified form of a heavier blanket.

Referring to Figure 1 of the drawing in detail, 1 indicates a pre-shrunk fabric. 2 designates a coating of synthetic resin. I prefer for this purpose such a material as divinyl acetylene which results from the vinyl derivatives of acetylene and is prepared by reacting acetylene in the presence of a non-alkali catalyst comprising cuprous chloride. A non-benzenoid polymer of acetylene having the empirical formula $C_8H_8$ may be employed. A pre-formed drying oil which is a liquid, non-volatile polymerization product of acetylene may be used. This rubber-like material may be referred to briefly as a class of material as a divinyl acetylene polymer. Isoprene on standing passes slowly into an elastic solid having the chemical composition and many of the chemical reactions of rubber but is resistant to the attack of oils and acids. I also desire to comprehend the use of poly-methylene-sulfide, a polysulfide reaction product. I also comprehend the use of a plastic polymer chloroprene (reaction product of monovinylacetylene and hydrochlorid acid); or polychloroprene and polybromoprene.

I refer to such products and their equivalents herein as "non-rubber" materials and comprehend both natural and synthetic materials having such characteristics. Such materials have the properties of resiliency and their surface is impervious to and inert to inks, oils, driers, solvents, acids and temperature and moisture conditions, particularly those conditions met in printing. The compounds mentioned for this purpose have peculiar properties not found in rubber of resisting over long periods the action of such material and the conditions which would deteriorate rubber.

Referring to the form in Figure 2, I provide a backing 1 of pre-shrunk material, then a coating of non-rubber material $3^a$ and of rubber which I designate 3, then an additional layer of pre-shrunk material 4 and a final coating of a synthetic resin as at 5.

I comprehend within my invention the production of a rubber blanket and the coating of the surface of the rubber blanket with a synthetic resin solution. The combination of a pre-shrunk backing, and if desired a pre-shrunk reinforcement, and the synthetic rubber or resin coating or impregnated composition will give the quickest results of my invention.

This synthetic resin solution or coating is suitably applied to the surface of the pre-shrunk fabric or is utilized to uniformly impregnate the fabric and to leave a smooth, uniform surface. It is then vulcanized in the usual manner to produce the resulting blanket.

Under some circumstances it is desirable to mix with the non-rubber material or the rubber material a reinforcement comprising fibrous stock in which the direction of the fibers is controlled. It is also feasible to use cotton fiber or ground leather or similar materials in certain types of blankets to further eliminate any tendency to distort out of shape. Ordinarily the pre-shrinking of the fabric will be adequate for the purpose.

It will also be understood that I desire to comprehend within my invention such modifications as may be necessary to adapt it to varying conditions and uses.

Having thus fully described my invention, what I claim as new and desire to secure by Letters Patent, is:

1. In a printer's blanket, a woven fabric backing pre-shrunk to prevent stretching in completed form, and an oil and ink resisting coating thereon.

2. In a printer's blanket, a woven fabric backing pre-shrunk to prevent stretching in completed form, and a divinyl acetylene polymer coating thereon.

3. As a new article of manufacture, a printer's blanket comprising a woven fabric backing pre-shrunk to prevent stretching in completed form, a rubber body portion and a protective coating on said rubber body portion formed from a synthetic resin solution.

ABRAHAM L. FREEDLANDER.